(12) United States Patent
Brett et al.

(10) Patent No.: US 11,054,498 B2
(45) Date of Patent: Jul. 6, 2021

(54) SYSTEM AND METHOD OF CONFIGURING AN EXTERNAL RADAR DEVICE THROUGH HIGH SPEED REVERSE DATA TRANSMISSION

(71) Applicant: NXP USA, Inc., Austin, TX (US)

(72) Inventors: Maik Brett, Taufkirchen (DE); Naveen Kumar Jain, Haryana (IN); Shreya Singh, Jharkhand (IN)

(73) Assignee: NXP USA, Inc., Austin, TX (US)

( * ) Notice: Subject to any disclaimer, the term of this patent is extended or adjusted under 35 U.S.C. 154(b) by 305 days.

(21) Appl. No.: 16/254,058

(22) Filed: Jan. 22, 2019

(65) Prior Publication Data
US 2020/0233059 A1 Jul. 23, 2020

(51) Int. Cl.
*G01S 7/35* (2006.01)
*G01S 7/03* (2006.01)
(Continued)

(52) U.S. Cl.
CPC ............. *G01S 7/35* (2013.01); *G01S 7/034* (2013.01); *G01S 7/28* (2013.01); *G01S 7/352* (2013.01); *G01S 13/28* (2013.01)

(58) Field of Classification Search
CPC ... G01S 7/35; G01S 7/352; G01S 7/28; G01S 7/034; G01S 7/03; G01S 13/0272;
(Continued)

(56) References Cited

U.S. PATENT DOCUMENTS

| 4,136,400 A | * | 1/1979 | Caswell | G06F 13/124 710/107 |
| 8,659,473 B2 | * | 2/2014 | Bauwelinck | H03F 1/56 342/148 |

(Continued)

FOREIGN PATENT DOCUMENTS

| CN | 104952422 A | 7/2015 | G09G 5/00 |
| CN | 104822041 A | 8/2015 | H04N 7/01 |

(Continued)

*Primary Examiner* — Erin F Heard
*Assistant Examiner* — Michael W Justice

(57) ABSTRACT

System and method of configuring an external radar device through high speed reverse data transmission. In one embodiment, the system includes a radar data processing module for processing radar data received from the external radar device, and a radar configuration management module for generating control data for controlling the external radar device. The system further includes a configurable half-duplex interface, wherein the configurable half-duplex interface, in response to receiving a turnaround command, switches between (1) a configuration for transmitting control data packets to the external radar device via a communication link, and (2) a configuration for receiving radar data packets from the external radar device via the communication link. A receive controller is provided and is configured to receive radar data packets from the external radar device via the communication link and the configurable half-duplex interface, wherein the receive controller is configured to extract radar data from the radar packets for subsequent processing by the radar data processing module. A transmit
(Continued)

controller is provided and configured to receive control data from the radar configuration management module, wherein the transmit controller is configured to generate radar control packets comprising the radar control data, and wherein the transmit controller is configured to transmit the radar control packets to the external radar device via the communication link and the configurable half-duplex interface when configured for transmitting data.

20 Claims, 8 Drawing Sheets

(51) Int. Cl.
*G01S 13/28* (2006.01)
*G01S 7/28* (2006.01)

(58) Field of Classification Search
CPC ...... G01S 13/32; G01S 13/536; G01S 13/583; G01S 13/931; G01S 13/02
USPC .............................................. 342/175, 82, 89
See application file for complete search history.

(56) References Cited

U.S. PATENT DOCUMENTS

| | | | |
|---|---|---|---|
| 2018/0199377 A1* | 7/2018 | Sanderovich | H04W 74/0816 |
| 2018/0348353 A1* | 12/2018 | Lien | H01Q 3/40 |
| 2018/0351250 A1* | 12/2018 | Achour | H01Q 1/364 |
| 2019/0137601 A1* | 5/2019 | Driscoll | G01S 13/422 |

FOREIGN PATENT DOCUMENTS

| | | |
|---|---|---|
| DE | 102015122722 A1 | 6/2016 |
| DE | 102015224782 A1 | 6/2017 |

* cited by examiner

US 11,054,498 B2

SYSTEM AND METHOD OF CONFIGURING AN EXTERNAL RADAR DEVICE THROUGH HIGH SPEED REVERSE DATA TRANSMISSION

BACKGROUND OF THE INVENTION

Advanced automotive radar systems can sense the distance between vehicles in real-time, thereby improving driving efficiency and safety. Automotive radar systems are used for: collision detection, warning and mitigation; collision avoidance; blind spot monitoring/blind spot detection; lane change assistance and lane departure warning system; etc.

Frequency Modulated Continuous Wave (FMCW) automotive radar systems transmit frequency-modulated signals, which are commonly referred to as chirps, towards a target. The chirp hits the target, and a portion echoes back to and is detected at a receive antenna. The frequency difference between the echo signal and the chirp signal increases with delay, and the delay is linearly proportional to the range, which is the distance of the target from the radar system. The echo signal is converted into digital radar data, which is subsequently processed to extract information about the target (e.g., distance).

BRIEF DESCRIPTION OF THE DRAWINGS

The present technology may be better understood, and its numerous objects, features, and advantages made apparent to those skilled in the art by referencing the accompanying drawings.

The use of the same reference symbols in different drawings indicates similar or identical items unless otherwise noted. The Figures are not necessarily drawn to scale.

DETAILED DESCRIPTION

Typical applications of automotive radar systems require the transmission of a sequence of chirps. Control data that defines chirp parameters, such as the length of chirp, is written ahead of time to a set of configuration registers in a radar transceiver, which is the device that transmit the chirps and detects the return echoes. The control data is usually generated by software executing on a processor of microcontroller unit (MCU). A serial communication link enables the control data to be transferred from the MCU to the transceiver.

In some radar systems, due to software and/or data transmission latency between the MCU and transceiver, control data must be fixed in the configuration registers of the transceiver for a sequence of chirps. However, in other radar systems the configuration registers can be updated with new control data by the MCU before each chirp. The configuration registers can be updated during each chirp inactive duration as will be more fully described below.

Figure 1:
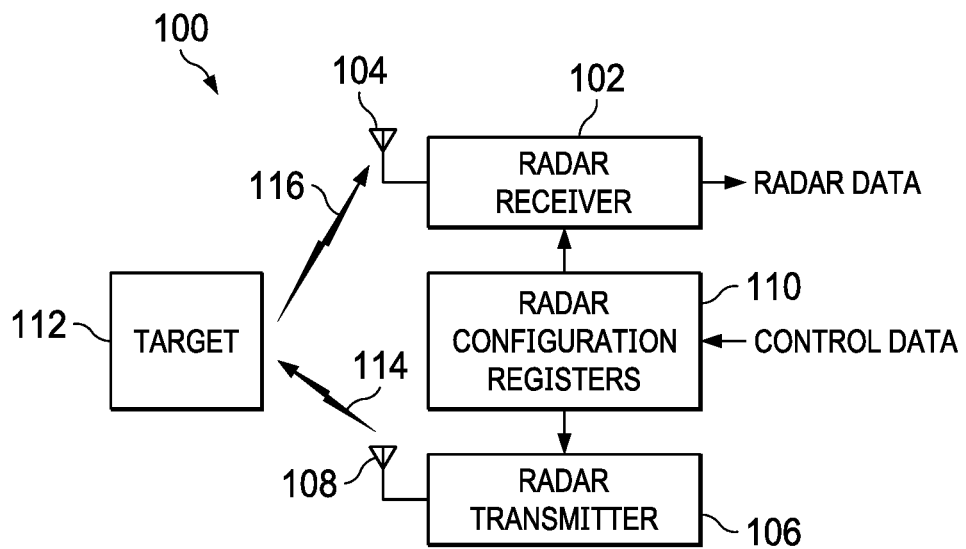
FIG. 1 illustrates relevant components of an example radar transceiver.
Figure 2:
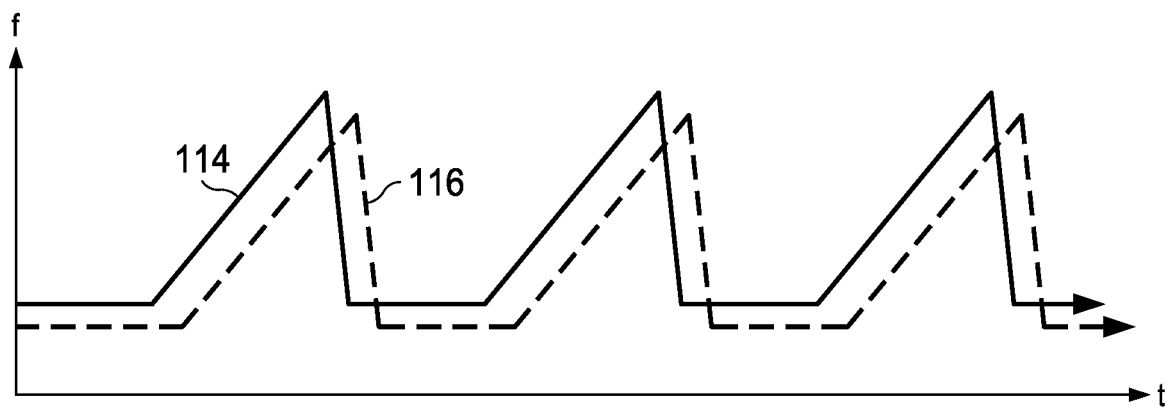
FIG. 2 illustrates relevant aspects of example radar chirp and echo signals.
Figure 3:
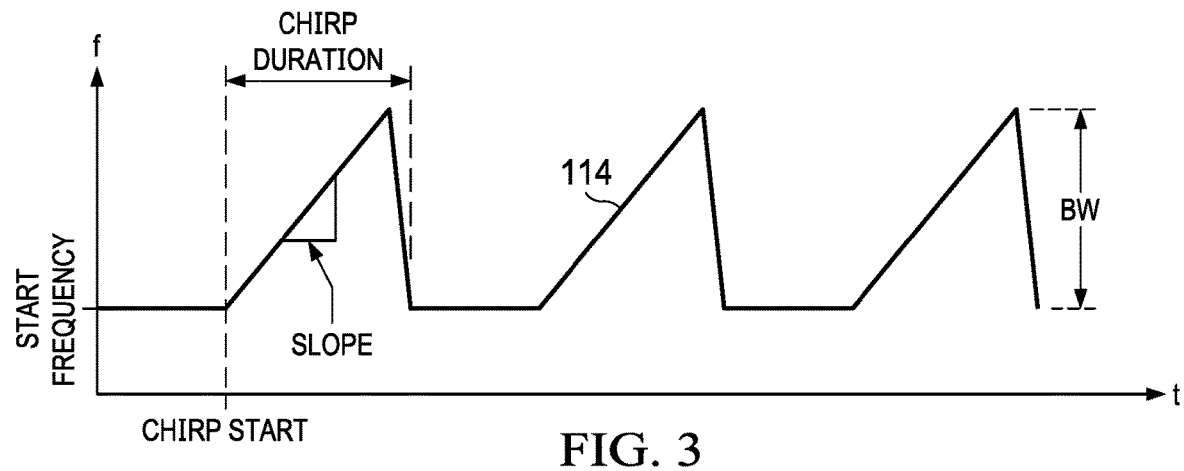
FIG. 3 illustrates relevant parameters of chirp signals.

FIGS. 1-3 are simple examples that illustrate relevant operational aspects of an example FMCW radar system. The radar system includes a transceiver 100, some components of which are shown in FIG. 1. More particularly the transceiver 100 includes a radar receive module 102, which is coupled to and configured to receive analog echo signals from receive antenna 104, and a radar transmitter module 106, which is coupled to and configured to provide chirp signals to transmit antenna 108. As shown in FIG. 1, transmit antenna 108 sends chirp signal 114 towards target 112, and receive antenna 104 detects echo signal 116. FIG. 2 illustrates example chirp signals 114 and example echo signals 116. Radar transmitter 106 generates chirps 114 that ramp up from a starting frequency, and continue to increase in frequency until an ending frequency is reached.

Radar transmitter 106 is configurable and can generate chirp signals with different parameters. A chirp's parameters are based on the type of radar application, e.g., short range, mid-range, or long range radar, the desired range resolution and velocity resolution, etc. A timing engine (not shown) programs transmitter 106 for desired chirps based on control data written to radar configuration registers 110.

Chirp control data is calculated by an MCU (not shown) and provided to transceiver 100 via a serial communication link as will be more fully described below. Radar receiver 102 is also configurable and processes (e.g., filters) echo signal 116 based upon control data written to radar configuration registers 110. Receiver 102 sends its digital radar data output to an MCU (not shown in FIG. 1) for subsequent processing to reveal range, velocity, angle, etc., of target 114.

Figure 4:
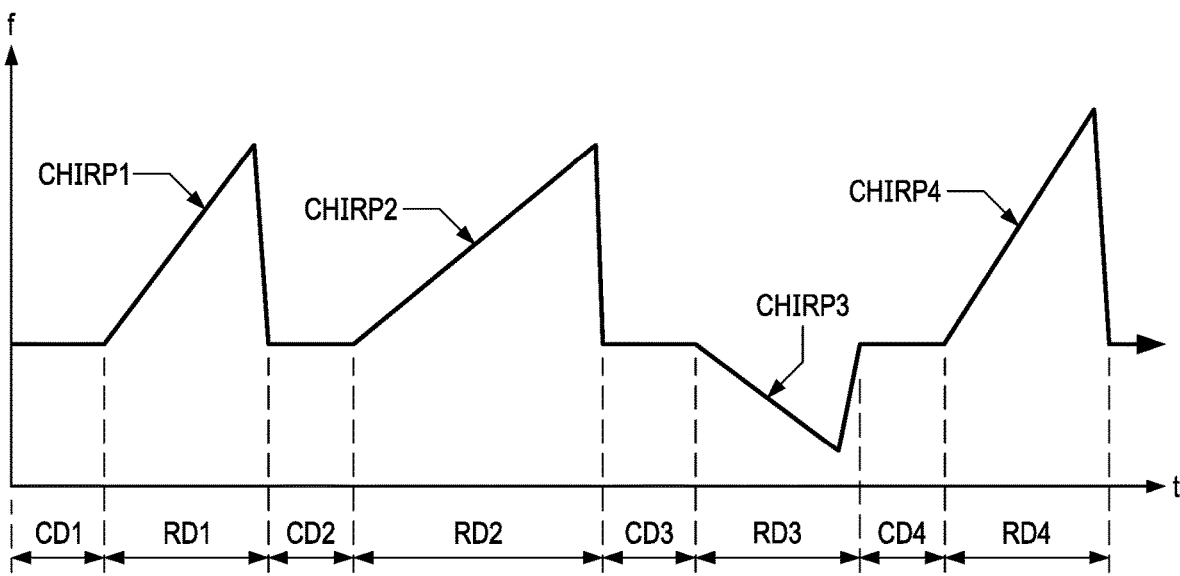
FIG. 4 illustrates an example radar system employing the radar transceiver of FIG. 1 and an example microcontroller unit.

The radar control data written to configuration registers 110 define chirp parameters. FIG. 3 illustrates some example chirp parameters, including the start frequency, the start time, the ramp slope, and the bandwidth. In the examples of FIGS. 2 and 3, the chirp parameters do not change with each chirp 112. In contrast FIG. 4 illustrates a chirp sequence in which chirp parameters do vary. The differences in chirp signals such as those shown in FIG. 4 can lead to echo signals that provide distinct information about target 112. For example Chirp 1 can be used to capture distance, velocity, and angle of target 114. Chirp 4 with a higher bandwidth and steeper slope can provide higher accuracy for detecting closer objects at higher range resolutions. Chirp 2 with a lower slope, can provide longer distance information at a poorer range resolution.

Figure 5:
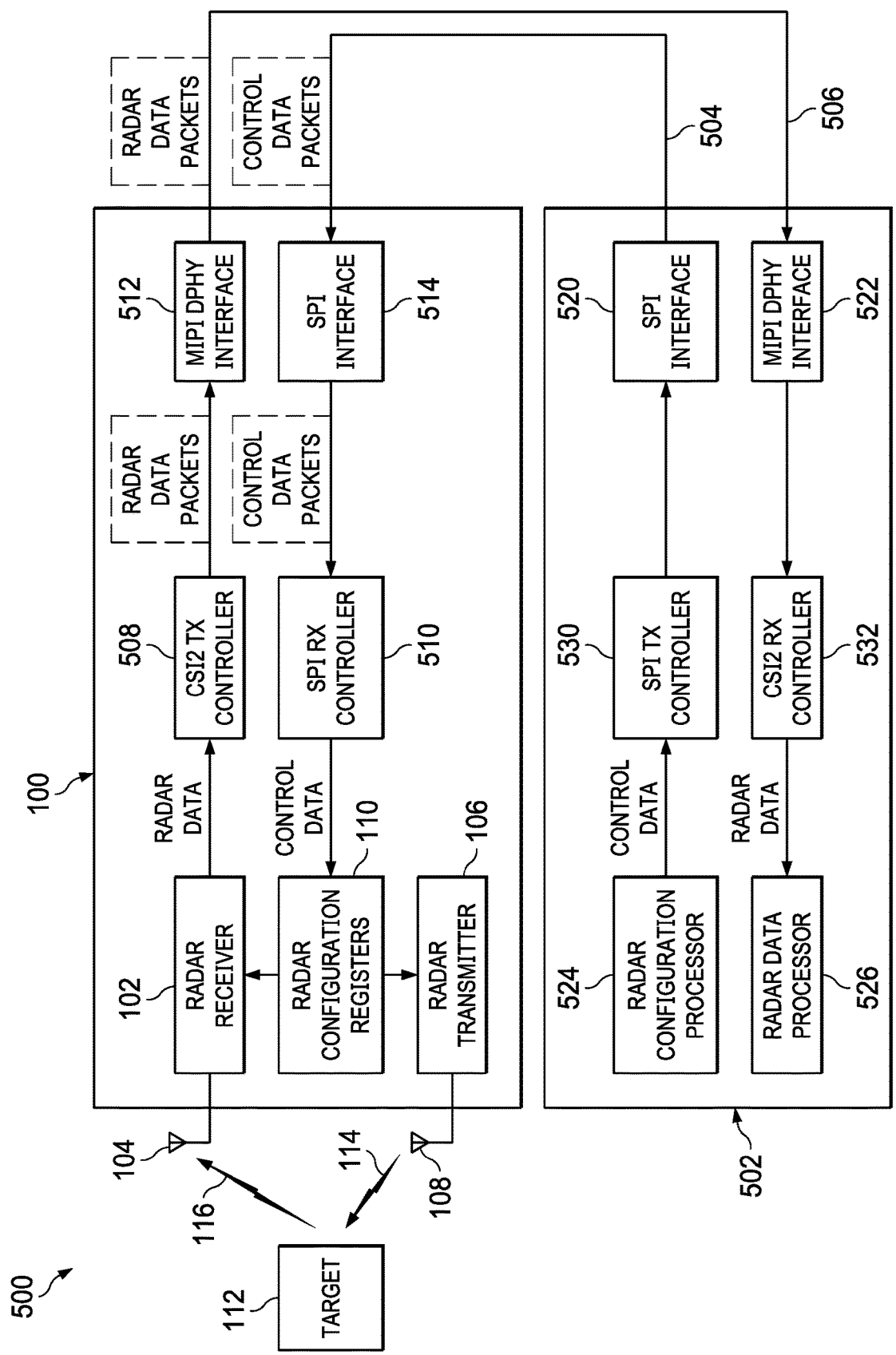
FIG. 5 illustrates example chirp signals generated by the radar system shown in FIG. 4.

As noted above, radar control data that defines chirp parameters, is provided to transceiver 100 by an MCU in data communication with transceiver 100 via a serial communication link. FIG. 5 illustrates relevant components of an example radar system 500 that includes MCU 502 in data communication with transceiver 100 via a pair of serial mediation links. In particular, FIG. 5 shows a serial peripheral interconnect (SPI) communication link 504, and a mobile industry processor interface (MIPI) camera serial interface-2 (CSI2) communication link 506. Control data is provided by MCU 502 in control data packets that are transmitted to interface 100 via SPI link 504, and radar data is provided by transceiver 100 in radar data packets transmitted to MCU 502 via MIPI CSI2 serial link 506.

With continuing reference to FIGS. 4 and 5, MCU 502 transmits a frame of control data packets to transceiver 100 during chirp inactive duration intervals designated CDx in FIG. 4, and transceiver 100 transmits a frame of radar data packets to MCU 502 during intervals designated RDx. The time interval CDx between chirps is constant and substantially shorter than the time interval RDx during which radar data packets are transmitted to MCU 502.

Transceiver 100 includes the configurable radar receiver 102, configurable radar transmitter 106, and radar configuration registers 110 that were described above. In addition transceiver 100 includes, a MIPI CSI2 transmit controller (hereinafter CSI2 transmit controller) 508 and an SPI receive controller 610. Each of controllers 508 and 510 may take form in programmable hardware or in software executing on a processor unit (not shown). Lastly transceiver 100 includes a pair of serial communication link interface circuits. More specifically, transceiver 100 includes MIPI D-PHY interface circuit (hereinafter MIPI interface circuit) 512, and SPI interface circuit 514.

MIPI is a standard that currently provides a pair of high-speed physical-layer (PHY) specifications: M-PHY and D-PHY. D-PHY was developed primarily to support camera and display interconnections in mobile devices. It is often used in conjunction with MIPI's CSI2 protocol specifications. It meets the demanding requirements of low power, low noise generation, and high noise immunity. The present disclosure will be described with reference to MIPI D-PHY interface circuits, it being understood the present disclosure should not be limited thereto. MIPID-PHY delivers data at up to 2.5 Gbits/s per link. FIG. 5 shows only 1 data link 506, and although not shown in the Figures a MIPI link consists of two differential signal lines and two lines for a differential clock.

MIPI interface circuit 512 supports half-duplex communication in which data flows in one direction, but the direction can be reversed. However MIPI interface circuit 512 is used only to send radar data packets to MCU 502 in the embodiment shown in FIG. 5.

CSI2 transmitter controller 508 receives echo radar data from radar receiver 102 in digital form. CSI2 transmit controller 508 includes the radar data in packets that are formatted according to the CSI2 specification. MIPI interface circuit 512 serializes the radar data packets it receives for subsequent transmission in a frame, which includes a start-of-frame (SOF) message and an end of frame (EOF) message, over link 506 to MCU 502.

SPI interface circuit 514 receives serialized radar control packets sandwiched between an SOF and an EOF via SPI link 504. After de-serializing the control packets, SPI interface circuit 504 sends them to SPI receiver controller 510, which extracts the radar control data for subsequent storage within the appropriate radar configuration registers 110. Again, radar transmitter 106 directly or indirectly uses the control data contained within the configuration registers 110 to generate chirp signals 112.

MCU 502, as shown, includes several components including a SPI interface circuit 520 and a MIPI interface circuit 522, which correspond to the SPI interface circuit 514 and MIPI interface circuit 512, respectively. MCU 502 also includes a radar configuration processor 524 and a radar data processor 526. Each of these modules may take form in software executing on a central processing unit (not shown).

Radar configuration processor 524 calculates control data that define chirp parameters on a chirp-by-chirp basis. Radar configuration processor 524 provides the control data it calculates to SPI transmit controller 530, which may take form in programmable hardware or in software executing on a processor. SPI transmit controller 530 creates control data packets that contain the control data calculated by radar configuration processor 524. These control data packets are forwarded to SPI interface circuit 520 where they are serialized before subsequent transmission in a frame to transceiver 100 via SPI link 504. MIPI interface circuit 522 receives the serialized radar data packets mentioned above. MIPI interface circuit 522 forwards the radar data packets to CSI2 receive controller 532 after deserialization. CSI2 receive controller 532 extracts radar data from the packets it receives for subsequent processing by radar data processor 526.

With continuing reference to FIGS. 4 and 5, system 500 can transmit a sequence of chirps towards target 114, each having different parameters. In other words, each successive chirp can be different in bandwidth, slope, starting frequency, etc., when compared to the previously transmitted chirp. To achieve this in the system shown within FIG. 5 a new set of control data must be transmitted to and stored within the radar configuration registers 110 prior to each chirp. As noted above, control data must be transmitted to transceiver 100 during chirp inactive duration intervals CDx. Thus, the control data for chirp 1 shown in FIG. 4 must be transmitted to transceiver 100 during chirp inactive duration interval CD1, the control data for chirp 2 must be transmitted during chirp inactive duration interval CD2, the control data for chirp 3 must be transmitted during chirp inactive duration interval CD3, etc.

SPI interface circuits are limited by the challenges needed to meet timing corresponding to the half cycle path frequency. As speed of radar systems increase, chirp inactive duration intervals CDx are being lowered to 3 μs a less. Unfortunately the SPI interface circuit used in FIG. 5 is unable to provide control data for the subsequent chirp during a 3 μs chirp inactive duration interval. As result, chirp-to-chirp update of control data within configuration registers 110 is not possible with a chirp inactive duration interval of 3 μs or less. One option to mitigate this problem is to simply increase the number of communication links used for transmitting control data so that it can be transmitted in parallel. Unfortunately, this would increase the costs and complexity of system 500 due to the addition of interface contacts, additional communication lines, additional interface circuits, etc.

Figure 6:
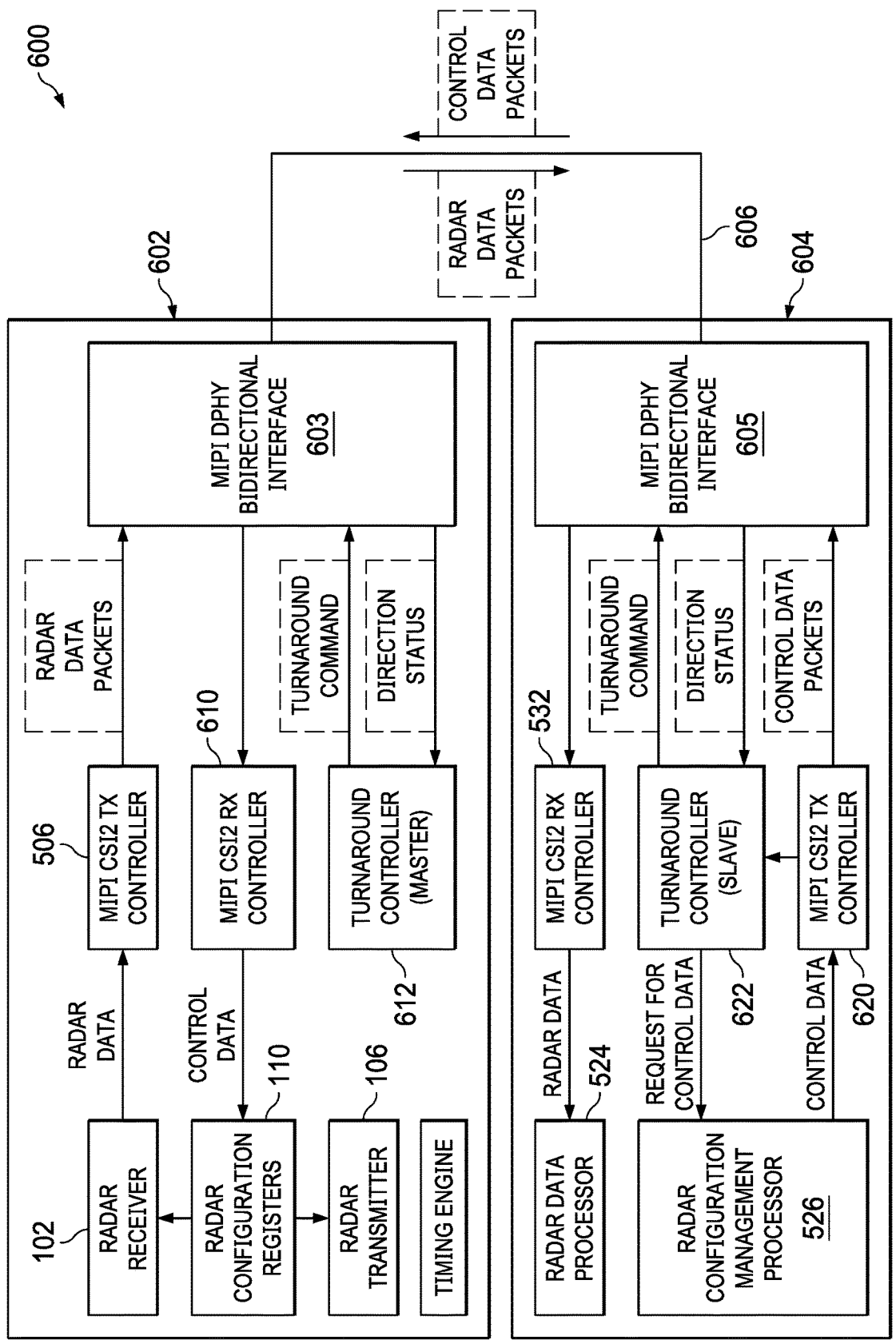
FIG. 6 illustrates relevant components of an example radar system employing one embodiment of the present disclosure.

The present disclosure is directed to a radar system in which both radar data and control data is transmitted over a single, bidirectional serial communication link operated in half duplex mode. An MIPI CSI2 communication link is one technology that can accommodate transmission of control data during chirp inactive duration intervals of 3 μs or less. FIG. 6 is a block diagram illustrating a radar system 600 employing one embodiment of the present disclosure. FIG. 6 shows radar system 600 that includes a transceiver 602 in data communication with an MCU 604 via a MIPI CSI2 serial link 606. Control data packets are transmitted from MCU 604 to transceiver 602 over link 606 during chirp inactive duration intervals, and radar data packets are transmitted from transceiver 602 to MCU 604 over link 606 between chirp inactive duration intervals.

Transceiver 602 includes some of the components shown in FIG. 5. More particularly, transceiver 602 includes the radar receiver 102, radar transmitter 106, and radar configuration registers 110 mentioned above. These components operate in the same or similar manner as described above. Transceiver 602, like transceiver 100 shown in FIG. 5, includes a MIPI CSI2 transmit controller 506 for receiving and packaging radar data into radar data packets in accordance with the CSI2 protocol.

MCU 604 also includes some of the components shown in FIG. 5. More particularly, MCU 604 includes the radar configuration processor 524 and the radar configuration processor 524 mentioned above. These components operate in the same or similar manner as described above. MCU 604 also includes the MIPI CSI2 receive controller 532 for extracting radar data from packets received from transceiver 602.

While the radar system 600 shown within FIG. 6 is similar in many regards to the system 500 shown in FIG. 5, substantial differences exist. For example, transceiver 602 includes MIPI D-PHY interface circuit 603, which is bidirectional and can exchange both radar and control data packets with MCU 604 via communication link 606. Transceiver 602 includes a master turnaround controller 612 for controlling the direction of bidirectional MIPI interface circuit 603 via a turnaround command signal. If interface circuit 603 is configured in the data transmit mode, interface circuit 603 will be reconfigured into data receive mode in response to the assertion of the turnaround command signal. If interface circuit 603 is configured in the receive mode, interface circuit 603 will be reconfigured into the transmit mode in response to the assertion of the turnaround command signal. Bidirectional interface 603 provides a direction status indicating its status (configured to transmit or configured to receive). Transceiver 602 also includes a MIPI CSI2 receive controller 610, which is configured to extract control data from CSI2 formatted control data packets received from MCU 604 via communication link 606 and interface circuit 603.

MCU 604 includes MIPI D-PHY interface circuit 605. Both interface circuits 603 and 605 operate half duplex mode. Interface circuit 605 is bidirectional and can exchange both radar and control data packets with transceiver 602 via communication link 606. MCU 604 includes a slave turnaround controller 622 for controlling the direction of bidirectional MIPI interface circuit 605 using a turnaround command signal. If interface circuit 605 is configured in the transmit mode, interface circuit 605 will be reconfigured into receive mode in response to the assertion of the turnaround command signal. If interface circuit 605 is configured in the receive mode, interface circuit 605 will be reconfigured into the transmit mode in response to the assertion of the turnaround command signal. Bidirectional interface 605 provides a direction status indicating its status (configured to transmit or configured to receive). MCU 604 includes a MIPI CSI2 transmit controller 620, which is configured to add control data to CSI2 formatted control data packets for subsequent transmission to receiver 602 via communication link 606 and interface circuit 605. These control data packets are subsequently forwarded in a frame to transceiver 602 during a chirp inactive duration interval via interface circuit 605 when it is configured for transmission. The control packets within a frame can be sandwiched between a start-of-frame (SOF) message and an end of frame (EOF) message.

Figure 7:
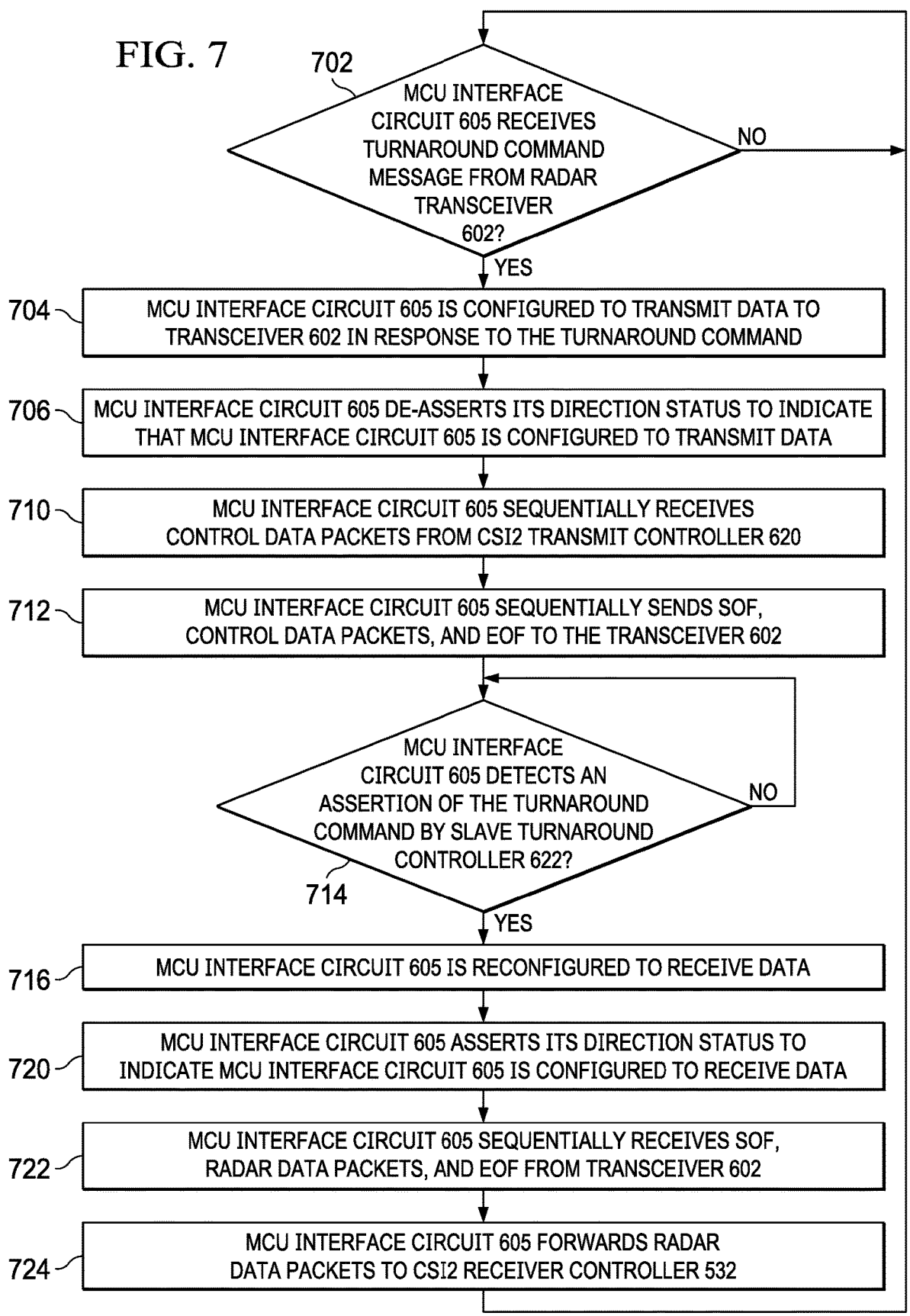
FIG. 7 illustrates relevant aspects of an example process employed in the radar system of FIG. 6.

FIGS. 7-10 illustrate operational aspects of transceiver 602 and MCU 604 in general, and individual components thereof in particular. FIG. 7 illustrates operational aspects of a process implemented by interface circuit 605. The process of FIG. 7 starts when interface circuit 605 receives a turnaround command from radar transceiver 602. Interface circuit 605 is configured or reconfigured for transmission of data to transceiver 602 in response to receiving this turnaround command. In step 706 bidirectional interface circuit 605 de-asserts its direction status to indicate that interface circuit 605 is configured to transmit data. Thereafter bidirectional interface circuit 605 sequentially receives control packets from CSI2 transmit controller 620. As the control packets are received, interface circuit 605 sequentially serializes and sends the control packets to transceiver 602 via communication link 606 in a frame, which includes SOF and EOF messages, as shown in step 712. CSI2 transmit controller 620 can send a signal to slave turnaround controller 622 after CSI2 transmit controller 620 sends the last control data packet of the frame to interface circuit 605. In response to this, slave turnaround controller 622 asserts the turnaround command, which is detected by interface circuit 605 as shown in step 714. In step 716, interface circuit 605 is reconfigured to receive data in response to the assertion of the turnaround command. Interface circuit 605 asserts its direction status to indicate that it is now configured to receive data as shown in step 720. At some point later interface circuit 605 begins to sequentially receive radar data packets, sandwiched between an SOF and EOF, from transceiver 602 via communication link 606. Interface circuit 605 deserializes and forwards the radar data packets to CSI2 receive controller 532 for subsequent processing as they are received.

Figure 8:
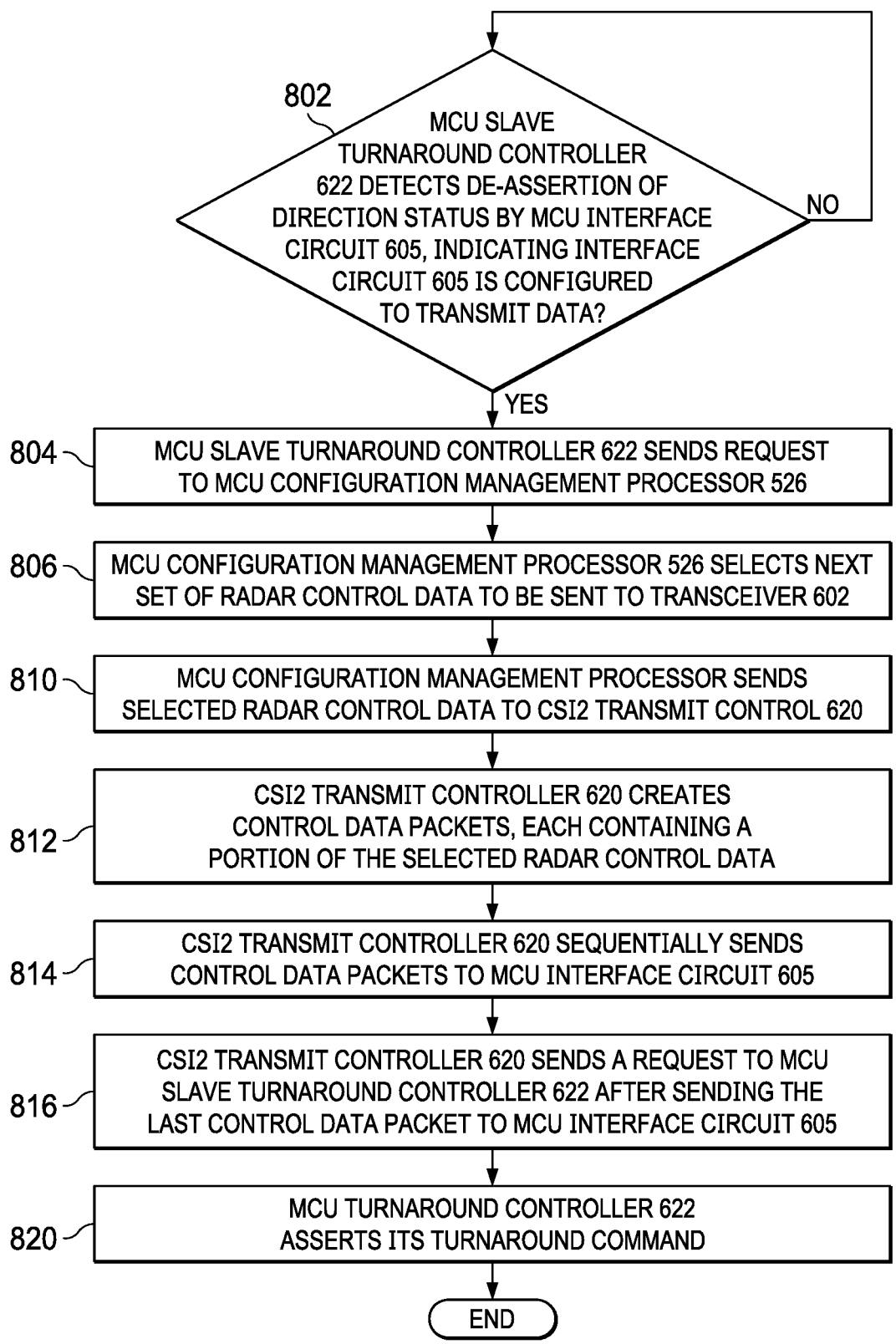
FIG. 8 illustrates relevant aspects of an example process employed in the radar system of FIG. 6.

FIG. 8 illustrates operational aspects of a process implemented by the slave turnaround controller 622, configuration management processor 526, and CSI2 transmit controller 620. The process of FIG. 8 begins with step 802 when slave turnaround controller 622 detects a de-assertion by interface circuit 605 of its direction status. The de-assertion of this signal indicates interface circuit 605 is configured to transmit data and corresponds to step 706 shown in FIG. 7. In step 804 the slave controller 622 sends a request to configuration management processor 526. This request effectively tells the configuration management processor that radar data for the last chirp has been received by MCU 602, and it is time to send a new set of control data to transceiver 602. In step 806 configuration management processor 526 selects the next set of radar control data to be sent to transceiver 602. Configuration management processor 526 sends the selected radar control data to CSI2 transmit controller 620, which in turn creates control data packets, each containing a portion of the selected radar control data as shown in step 812. In step 814 CSI2 transmit controller 620 sequentially sends the control data packets to interface circuit 605. In step 816 CSI2 transmit controller 620 sends a request to the slave turnaround controller 622 after sending the last control data packet containing new control data to interface circuit 605. In response to receiving this request slave turnaround controller 622 asserts its turnaround command in step 820, which results in reconfiguration of interface circuit 605 to the receive mode. Step 820 corresponds to step 714 in FIG. 7.

Figure 9:
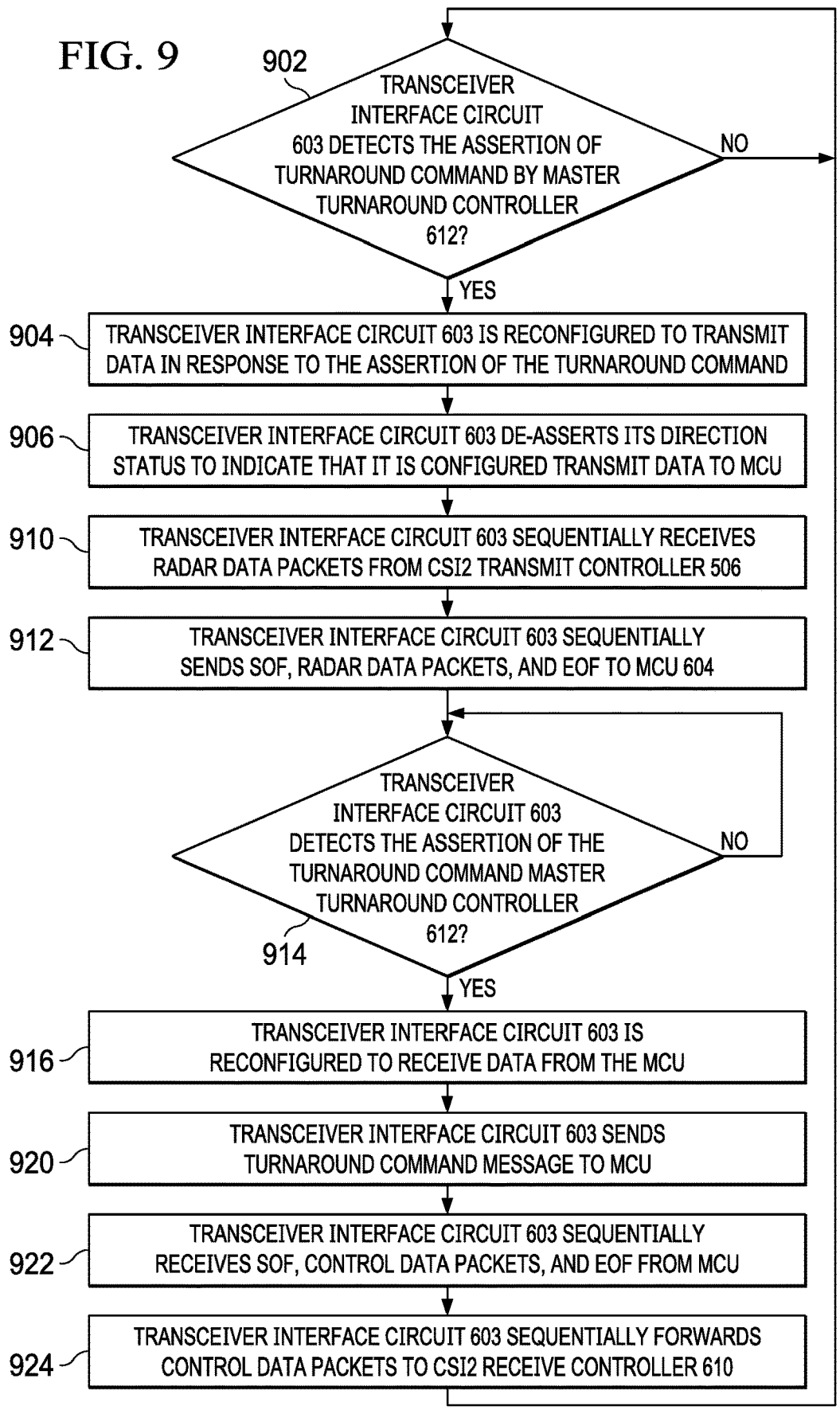
FIG. 9 illustrates relevant aspects of an example process employed in the radar system of FIG. 6.

FIG. 9 illustrates a process implemented by the interface circuit 603 of transceiver 602. The process of FIG. 9 begins with step 902 in which interface circuit 603 detects an assertion of the turnaround command by master turnaround controller 612. In response interface circuit 603 is reconfigured to transmit data as shown in step 904. Interface circuit 603 de-asserts its direction status to indicate that it has successfully been reconfigured to transmit data to MCU 602. In step 910, interface circuit 603 receives radar data packets from CSI2 transmit controller 506. As they are received, interface circuit 603 serializes and sequentially sends the radar data packets to MCU 604 via communication link 606 as shown in step 912. Interface circuit 603 sends the radar data packets to MCU 602 in a frame that contains an SOF and EOF. Interface circuit 603 then detects an assertion of turnaround command by transceiver turnaround controller 612. And in response interface circuit 603 is reconfigured to receive data from MCU 604 as shown in step 916. Additionally, transceiver interface circuit 603 sends a turnaround command message to MCU via link 606 in step 920, which corresponds to step 702 in FIG. 7. Step 920 may occur before step 916. In step 922 interface circuit 603 sequentially receives and serializes control data packets from MCU 604. In step 924 interface circuit 603 sequentially forwards the control data packets to CSI2 receive controller 610 as interface circuit 603 serializes the control data packets it receives.

Figure 10:
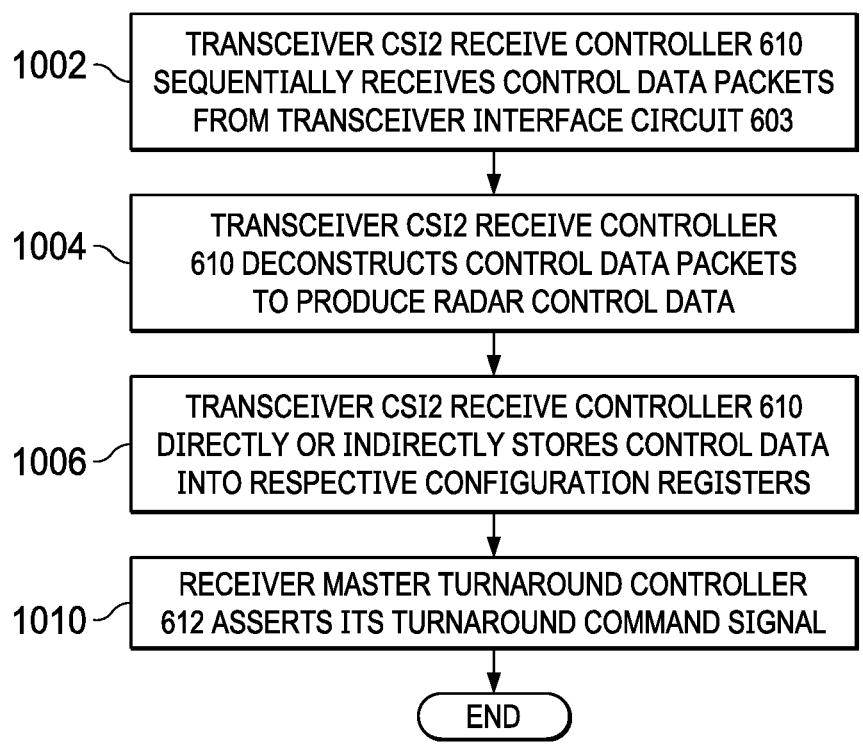
FIG. 10 illustrates relevant aspects of an example process employed in the radar system of FIG. 6.

FIG. 10 illustrates process is implemented by the CSI2 receive controller 610 and the master turnaround controller 612 shown in FIG. 6. The process in FIG. 10 starts when CSI2 receive controller 610 sequentially receives control data packets from interface circuit 603. CSI2 receive controller 610 deconstructs the control data packets it receives to render the radar control data contained therein as shown in step 1004. Eventually, this control data will be stored in radar configuration registers 110 in time for the next chirp generation and transmission. In step 1010 the master turnaround controller 612 asserts its turnaround command signal in response to CSI2 receive controller 610 receiving the last control packet from interface circuit 603. Step 1010 corresponds to step 902 in FIG. 9.

The following are various embodiments of the present disclosure.

In one embodiment an apparatus includes an MCU, which in turn includes a radar data processing module for processing radar data received from a radar device, a radar configuration management module for generating control data for controlling the radar device, a configurable half-duplex (CHD) interface, wherein the MCU CHD interface, in response to receiving a turnaround command, switches between (1) a configuration for transmitting control data packets to the radar device via a communication link, and (2) a configuration for receiving radar data packets from the radar device via the communication link. The MCU further includes a receive controller configured to receive radar data packets from the radar device via the communication link and the MCU CHD interface, wherein the receive controller is configured to extract radar data from the radar packets for subsequent processing by the radar data processing module. The MCU also includes a transmit controller configured to receive control data from the radar configuration management module, wherein the transmit controller is configured to generate radar control packets comprising the radar control data, and wherein the transmit controller is configured to transmit the radar control packets to the radar device via the communication link and the MCU CHD interface when configured for transmitting data. The apparatus may further include the radar device, and the communication link, wherein the radar device includes a radar device CHD interface, wherein the radar device CHD interface, in response to receiving a turnaround command, switches between (1) a configuration for transmitting data to the MCU CHD interface via a communication link, and (2) a configuration for receiving data from the MCU CHD interface via the communication link, and wherein the radar device is configured to generate a chirp signal using control data contained in radar control packets that are received from the MCU via the communication link, wherein the radar device is configured to send radar data packets to the MCU via the communication link while the radar device is generating chirp signals, and wherein the MCU is configured to transmit control packets to the radar device via the communication link and between successive generation of chirp signals. The MCU may further include a memory storing instructions, and a central processing unit (CPU) for executing instructions stored in the memory, wherein the CPU implements the receive controller in response to executing first instructions stored in the memory, and wherein the CPU implements the transmit controller in response to executing second instructions stored in the memory, wherein the first and second instructions are distinct. The MCU may further include a turnaround controller for generating the turnaround command. The turnaround controller may be configured to generate the turnaround command in response to the MCU CHD interface transmitting an end-of-frame (EOF) message to the radar device via the communication link. The radar device may further include a turnaround controller for generating the turnaround command. The MCU CHD interface is configured to transition to the configuration for transmitting data to the radar device CHD interface via the communication link in response to the generation of the turnaround command by the turnaround controller, and wherein the radar CHD is configured to transition to the configuration for receiving data from the MCU CHD interface via the communication link in response to the generation of the turnaround command by the turnaround controller.

In another embodiment, a method includes configuring an interface of a microcontroller (MCU) to receive data from a radar device, which is external to the MCU, and the radar device generating a first radar chirp signal. While the first radar chirp signal is being generated, the MCU interface receives data packets from the radar device via a communication link after the MCU interface is configured to receive data. The MCU interface is reconfigured to transmit data to the radar device after the MCU interface receives the data packets. The MCU interface transmits control packets to the radar device via the communication link after the MCU interface is reconfigured to transmit data, and the radar device generates a second radar chirp signal using control data contained in the control packets, wherein the control packets are transmitted to the radar device between the generation of the first and second radar chirp signals. The method may also include configuring an interface of the radar device to transmit data, and the radar device interface transmitting the data packets after the radar device interface is configured to transmit data. The method may further include the radar device interface receiving a first turnaround command from a turnaround controller of the radar device, and reconfiguring the radar device interface to receive data in response to the radar device interface receiving the first turnaround command. The method may yet further include the radar device interface transmitting a first turnaround command message to the MCU interface before the radar device interface is reconfigured to receive data, and the MCU interface receiving the first turnaround command message from the radar device via the communication link after the MCU interface receives the data packets, wherein the reconfiguring of the MCU interface is implemented in response to the MCU interface receiving the first turnaround command message from the radar device. The method may still further include the MCU interface receiving a second turnaround command from a turnaround controller of the MCU after the MCU interface transmits the control packets, reconfiguring the MCU interface to receive data in response to the MCU interface receiving the second turnaround command. The method may also include the MCU interface sending a second turnaround command message to the radar device via the communication link before the MCU interface is reconfigured to receive data, the radar device interface receiving the second turnaround command message, reconfiguring the radar device interface to transmit data in response to the radar device interface receiving the second turnaround command message, the radar device interface transmitting additional data packets after the radar device interface is reconfigured to transmit data in response to receiving the second turnaround command message, and the MCU interface receiving the additional data packets from the radar device via the communication link. The method may also include the MCU interface de-asserting a status signal after the MCU interface is reconfigured to transmit data, the MCU turnaround controller providing a request to a control data management module of the MCU in response to the de-assertion of the status signal, the control data management module providing the control data to a transmission controller of the MCU in response to the control data management module receiving the request, the MCU transmission controller creating the control packets that comprise the control data, wherein each of the control packets comprises a header and a footer, and the MCU transmission controller providing the control packets to the MCU interface, wherein the MCU interface sends the control packets to the radar device interface in response to the MCU interface receiving the control packets from the MCU transmission controller. The method may still further include the MCU turnaround controller sending the second turnaround command to the radar device interface via the MCU interface after the MCU interface sends the control packets to the radar device interface, and the MCU interface asserting the status signal in response to the MCU turnaround controller sending the second turnaround command message to the radar device interface via the MCU interface. Still further, the method may include the radar device interface de-asserting a status signal after the radar device interface is configured to transmit data, the radar device turnaround controller generating a request in response to the de-assertion of the status signal by the radar interface device, a radar receiver module providing additional data to a transmission controller of the radar device in response to the generation of the request, the radar device transmission controller creating additional data packets that comprise the additional data, and the radar device transmission controller providing the additional data packets to the radar device interface, wherein the radar device interface sends the additional data packets to the MCU interface in response to the radar device interface receiving the additional data packets from the radar device transmission controller. Lastly the method may include an MCU receiver controller receiving the data packets, the MCU receiver controller extracting radar data from the data packets, and the MCU receiver controller forwarding the radar data directly or indirectly to a data processing module of the MCU.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
configuring an interface of a microcontroller (MCU) to receive data packets from a radar device, which is external to the MCU;
the radar device generating a first radar chirp signal;
after the MCU interface is configured to receive data packets, the MCU interface receiving first data packets from the radar device via a communication link while the first radar chirp signal is being generated;
the MCU interface receiving a first turnaround command message from the radar device after the MCU interface receives the first data packets;
reconfiguring the MCU interface to transmit data packets in response to the MCU interface receiving the first turnaround command;
the MCU interface transmitting first control packets to the radar device via the communication link after the MCU interface is reconfigured to transmit data packets;
the radar device generating a second radar chirp signal using first control data contained in the first control packets;
wherein the first control packets are transmitted to the radar device between the generation of the first and second radar chirp signals.

2. The method of claim 1 further comprising:
configuring an interface of the radar device to transmit data packets;
the radar device interface transmitting the first data packets after the radar device interface is configured to transmit data packets.

3. The method of claim 2 further comprising:
the radar device interface receiving the first turnaround command from a turnaround controller of the radar device;
reconfiguring the radar device interface to receive data packets in response to the radar device interface receiving the first turnaround command.

4. The method of claim 3 further comprising:
the radar device interface transmitting the first turnaround command message to the MCU interface before the radar device interface is reconfigured to receive data packets;
the MCU interface receiving the first turnaround command message from the radar device via the communication link after the MCU interface receives the first data packets;
wherein the reconfiguring of the MCU interface to transmit data packets is implemented in response to the MCU interface receiving the first turnaround command message from the radar device.

5. The method of claim 4 further comprising:
the MCU interface receiving a second turnaround command from a turnaround controller of the MCU after the MCU interface transmits the first control packets;
reconfiguring the MCU interface to receive data packets in response to the MCU interface receiving the second turnaround command.

6. The method of claim 5 further comprising:
the MCU interface sending the second turnaround command message to the radar device via the communication link before the MCU interface is reconfigured to receive data packets;
the radar device interface receiving the second turnaround command message;

reconfiguring the radar device interface to transmit data packets in response to the radar device interface receiving the second turnaround command message;
the radar device interface transmitting additional data packets after the radar device interface is reconfigured to transmit data packets in response to receiving the second turnaround command message;
the MCU interface receiving the additional data packets from the radar device via the communication link.

7. The method of claim 6 further comprising:
the MCU interface de-asserting a status signal after the MCU interface is reconfigured to transmit data packets;
the MCU turnaround controller providing a request to a control data management module of the MCU in response to the de-assertion of the status signal;
the control data management module providing the first control data to a transmission controller of the MCU in response to the control data management module receiving the request;
the MCU transmission controller creating the first control packets that comprise the first control data, wherein each of the first control packets comprises a header and a footer;
the MCU transmission controller providing the first control packets to the MCU interface;
wherein the MCU interface sends the first control packets to the radar device interface in response to the MCU interface receiving the first control packets from the MCU transmission controller.

8. The method of claim 7 further comprising:
the MCU turnaround controller sending the second turnaround command to the radar device interface via the MCU interface after the MCU interface sends the first control packets to the radar device interface;
the MCU interface asserting the status signal in response to the MCU turnaround controller sending the second turnaround command message to the radar device interface via the MCU interface.

9. The method of claim 8 further comprising:
the radar device interface de-asserting a status signal after the radar device interface is reconfigured to transmit data packets;
the radar device turnaround controller generating a request in response to the de-assertion of the status signal by the radar interface device;
a radar receiver module providing the additional data to a transmission controller of the radar device in response to the generation of the request;
the radar device transmission controller creating the additional data packets that comprise the additional data;
the radar device transmission controller providing the additional data packets to the radar device interface;
wherein the radar device interface sends the additional data packets to the MCU interface in response to the radar device interface receiving the additional data packets from the radar device transmission controller.

10. The method of claim 9 further comprising:
an MCU receiver controller receiving the additional data packets;
the MCU receiver controller extracting radar data from the additional data packets;
the MCU receiver controller forwarding the radar data directly or indirectly to a data processing module of the MCU.

11. An apparatus comprising:
an MCU comprising:
a radar data processing module for processing radar data received from a radar device;
a radar configuration management module for generating control data for controlling the radar device;
a configurable half-duplex (CHD) interface, wherein the MCU CHD interface, in response to receiving a turnaround command from the radar device, switches between (1) a configuration for transmitting control data packets to the radar device via a communication link, and (2) a configuration for receiving radar data packets from the radar device via the communication link;
a receive controller configured to receive radar data packets from the radar device via the communication link and the MCU CHD interface, wherein the receive controller is configured to extract radar data from the radar packets for subsequent processing by the radar data processing module;
a transmit controller configured to receive control data from the radar configuration management module, wherein the transmit controller is configured to generate radar control packets comprising the radar control data, and wherein the transmit controller is configured to transmit the radar control packets to the radar device via the communication link and the MCU CHD interface when configured for transmitting data,
wherein the radar device is configured to generate a chirp signal using control data contained in radar control packets that are received from the MCU via the communication link;
wherein the radar device is configured to send radar data packets to the MCU via the communication link while the radar device is generating chirp signals;
wherein the MCU is configured to transmit control packets to the radar device via the communication link and between successive generation of chirp signals.

12. The apparatus of claim 11 further comprising:
the radar device;
the communication link;
the radar device comprising a radar device CHD interface, wherein the radar device CHD interface, in response to receiving a turnaround command, switches between (1) a configuration for transmitting data to the MCU CHD interface via the communication link, and (2) a configuration for receiving data from the MCU CHD interface via the communication link.

13. The apparatus of claim 12 wherein the radar device further comprises a turnaround controller for generating the turnaround command.

14. The apparatus of claim 13 wherein the MCU CHD interface is configured to transition to the configuration for transmitting control data packets to the radar device via the communication link in response to the generation of the other turnaround command by the turnaround controller, and wherein the radar CHD is configured to transition to the configuration for receiving control data packets from the MCU CHD interface via the communication link in response to the generation of the other turnaround command by the turnaround controller.

15. The apparatus of claim 11 wherein the MCU comprises a memory storing instructions, and a central processing unit (CPU) for executing instructions stored in the memory, wherein the CPU implements the receive controller in response to executing first instructions stored in the memory, and wherein the CPU implements the transmit controller in response to executing second instructions stored in the memory, wherein the first and second instructions are distinct.

16. The apparatus of claim 11 wherein the MCU further comprises a turnaround controller for generating another turnaround command, wherein the MCU CHD interface, in response to receiving the other turnaround command, switches between (1) the configuration for transmitting control data packets to the radar device via the communication link, and (2) the configuration for receiving radar data packets from the radar device via the communication link.

17. The apparatus of claim 16 wherein the turnaround controller is configured to generate the other turnaround command in response to the MCU CHD interface transmitting an end-of-frame (EOF) message to the radar device via the communication link.

18. An apparatus comprising:
a radar device comprising:
a set of configuration registers for storing control data;
a radar transmitter module for generating chirp signals based on control data in the configuration register;
a radar receiver module for generating radar data based on chirp echo signals;
a configurable half-duplex (CHD) interface, wherein the radar device CHD interface, in response to receiving a turnaround command from an MCU, switches between (1) a configuration for transmitting radar data packets to the MCU via a communication link, and (2) a configuration for receiving control data packets from the MCU via the communication link;
a receive controller configured to receive control data packets from the MCU via the communication link and the radar device CHD, wherein the receive controller is configured to extract control data from the control data packets for subsequent storage in the configuration registers;
a transmit controller configured to receive radar data from the radar receiver module, wherein the transmit controller is configured to generate radar data packets comprising the radar data, and wherein the transmit controller is configured to transmit the radar data packets to the MCU via the communication link and the radar device CHD interface when configured for transmitting radar data packets,
wherein the radar device is configured to generate a chirp signal using control data contained in radar control packets that are received from the MCU via the communication link;
wherein the radar device is configured to send radar data packets to the MCU via the communication link while the radar device is generating chirp signals;
wherein the MCU is configured to transmit control packets to the radar device via the communication link and between successive generation of chirp signals.

19. The apparatus of claim 18 wherein the radar device further comprises a turnaround controller for generating another turnaround command.

20. The apparatus of claim 19 wherein the turnaround controller is configured to generate the other turnaround command in response to the radar device CHD interface transmitting an end-of-frame (EOF) message to the MCU via the communication link.

* * * * *